(12) United States Patent
Liu

(10) Patent No.: US 12,189,256 B2
(45) Date of Patent: Jan. 7, 2025

(54) PIXEL COMPRISING A COMMON TRANSISTOR HAVING ONE OF A SOURCE AND A DRAIN CONNECTED TO A FIRST COMMON ELECTRODE LINE AND THE OTHER CONNECTED TO A SECOND COMMON ELECTRODE LINE

(71) Applicant: SHENZHEN CHINA STAR OPTOELECTRONICS SEMICONDUCTOR DISPLAY TECHNOLOGY CO., LTD., Shenzhen (CN)

(72) Inventor: Sanhong Liu, Shenzhen (CN)

( * ) Notice: Subject to any disclaimer, the term of this patent is extended or adjusted under 35 U.S.C. 154(b) by 0 days.

(21) Appl. No.: 17/620,697

(22) PCT Filed: Dec. 16, 2021

(86) PCT No.: PCT/CN2021/138863
§ 371 (c)(1),
(2) Date: Dec. 19, 2021

(87) PCT Pub. No.: WO2023/103014
PCT Pub. Date: Jun. 15, 2023

(65) Prior Publication Data
US 2024/0045293 A1 Feb. 8, 2024

(30) Foreign Application Priority Data
Dec. 7, 2021 (CN) .......................... 202111512044.9

(51) Int. Cl.
*G02F 1/1368* (2006.01)
*G02F 1/1362* (2006.01)

(52) U.S. Cl.
CPC ...... *G02F 1/1368* (2013.01); *G02F 1/136213* (2013.01); *G02F 1/136286* (2013.01)

(58) Field of Classification Search
None
See application file for complete search history.

(56) References Cited

U.S. PATENT DOCUMENTS

2006/0208984 A1 9/2006 Kim
2008/0284929 A1* 11/2008 Kimura ............. G02F 1/136213
349/48

(Continued)

FOREIGN PATENT DOCUMENTS

CN 104808404 A 7/2015
CN 106842750 A 6/2017

(Continued)

*Primary Examiner* — Paul C Lee

(57) ABSTRACT

A pixel, an array substrate, and a display device are provided. The pixel includes a first driving transistor, a first storage capacitor, a second driving transistor, a second storage capacitor, and a common transistor. Gates of the first driving transistor and the second driving transistor are connected to a scan line. One of a source and a drain of the first driving transistor and the second driving transistor are connected to a data line. Another one of the source and the drain of the first driving transistor is connected to a first common electrode line through the first storage capacitor. Another one of the source and the drain of the second driving transistor is connected to a second common electrode line through the second storage capacitor. A source and a drain of the common transistor are respectively connected to the first common electrode line and the second common electrode line.

6 Claims, 5 Drawing Sheets

(56) References Cited

U.S. PATENT DOCUMENTS

| | | |
|---|---|---|
| 2014/0253851 A1 | 9/2014 | Takano |
| 2014/0267997 A1 | 9/2014 | Hasegawa |
| 2015/0002421 A1 | 1/2015 | Kim |
| 2016/0306244 A1* | 10/2016 | Yu .................. G02F 1/1339 |
| 2017/0097546 A1 | 4/2017 | Lazo Martinez |
| 2017/0242305 A1 | 8/2017 | Liao |
| 2019/0129226 A1* | 5/2019 | Gan .................. G02F 1/134309 |
| 2020/0257177 A1* | 8/2020 | Moriwaki ............ G02F 1/13318 |

FOREIGN PATENT DOCUMENTS

| | | | |
|---|---|---|---|
| CN | 107844008 A | 3/2018 | |
| CN | 111176041 A | 5/2020 | |
| CN | 111326122 A * | 6/2020 | ............. G09G 3/006 |
| WO | 2019071813 A1 | 4/2019 | |

* cited by examiner

PIXEL COMPRISING A COMMON TRANSISTOR HAVING ONE OF A SOURCE AND A DRAIN CONNECTED TO A FIRST COMMON ELECTRODE LINE AND THE OTHER CONNECTED TO A SECOND COMMON ELECTRODE LINE

FIELD OF DISCLOSURE

The present disclosure relates to the field of display technologies, in particular to a pixel, an array substrate, and a display device.

BACKGROUND

Referring to FIG. 1, which shows a schematic diagram of a pixel of an array substrate in the prior art. A pixel 10 includes a data line 11, a scan line 12, a common electrode line 13, and a shared electrode line 14. The data line 11 and the shared electrode line 14 extend in a vertical direction, and the scan line 12 and the common electrode line 13 extend in a horizontal direction. Two adjacent common electrode lines 13 are electrically connected by a connecting electrode 15. During a manufacturing process, the common electrode line 13 may be short-circuited with the data line 11 in area A1, and may also be may be short-circuited with the shared electrode line 14 in area A2. However, when a signal detection process is performed, since the common electrode lines will cause grid-like connection after being electrified, it is impossible to completely locate specific locations of defect lines.

Accordingly, it is necessary to provide a pixel, an array substrate, and a display device to solve the problems existing in the prior art.

SUMMARY OF DISCLOSURE

In order to solve the above-mentioned problems of the prior art, a purpose of the present disclosure is to provide a pixel, an array substrate, and a display device, which realize a vertical connection of common electrodes, and ensure that defect points of lines in a horizontal direction can be detected and located.

To achieve the above purpose, the present disclosure provides a pixel, including: a first driving transistor, wherein a gate of the first driving transistor is connected to a scan line, and one of a source and a drain of the first driving transistor is connected to a data line; a first storage capacitor, wherein one end of the first storage capacitor is connected to a first common electrode line, and another end of the first storage capacitor is connected to another one of the source and the drain of the first driving transistor; a second driving transistor, wherein a gate of the second driving transistor is connected to the scan line, and one of a source and a drain of the second driving transistor is connected to the data line; a second storage capacitor, wherein one end of the second storage capacitor is connected to a second common electrode line, and another end of the second storage capacitor is connected to another one of the source and the drain of the second driving transistor; and a common transistor, wherein one of a source and a drain of the common transistor is connected to the first common electrode line, and another one of the source and the drain of the common transistor is connected to the second common electrode line.

The present disclosure also provides an array substrate, including: a plurality of data lines extending along a vertical direction; a plurality of scan lines and a plurality of common electrode lines extending along a horizontal direction; and a plurality of pixels arranged in an array, wherein each of the pixels includes a first sub-pixel and a second sub-pixel arranged along the horizontal direction, and the first sub-pixel and the second sub-pixel are connected to a same data line and a same scan line; the first sub-pixel includes a first storage capacitor, the second sub-pixel includes a second storage capacitor, one end of the first storage capacitor is connected to a first common electrode line, and one end of the second storage capacitor is connected to a second common electrode line adjacent to the first common electrode line; each of the pixels further includes a common transistor, one of a source and a drain of the common transistor is connected to the first common electrode line, and another one of the source and the drain of the common transistor is connected to the second common electrode line.

The present disclosure also provides a display device, including: the above-mentioned array substrate; an opposite substrate opposite to the array substrate and including an opposite electrode; and a liquid crystal layer disposed between the array substrate and the opposite substrate, wherein the first sub-pixel includes a first liquid crystal capacitor, the second sub-pixel includes a second liquid crystal capacitor, and one end of the first liquid crystal capacitor and one end of the second liquid crystal capacitor are connected to the opposite electrode.

In comparison with the prior art, the present disclosure uses the common transistor to connect the first common electrode line and the adjacent second common electrode line. When the common transistor is turned on, the first common electrode line and the second common electrode line are electrically connected, thereby ensuring a stability of a common voltage. In addition, when a signal detection process is performed, the common transistor is turned off, so that lines in the horizontal direction can be located according to an acquired short-circuit signal, and defect lines can be further repaired.

BRIEF DESCRIPTION OF DRAWINGS

The following describes specific embodiments of the present disclosure in detail with reference to accompanying drawings to make technical solutions and other beneficial effects of the present disclosure obvious.

DETAILED DESCRIPTION

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the scope of protection of the present disclosure.

Figure 1:
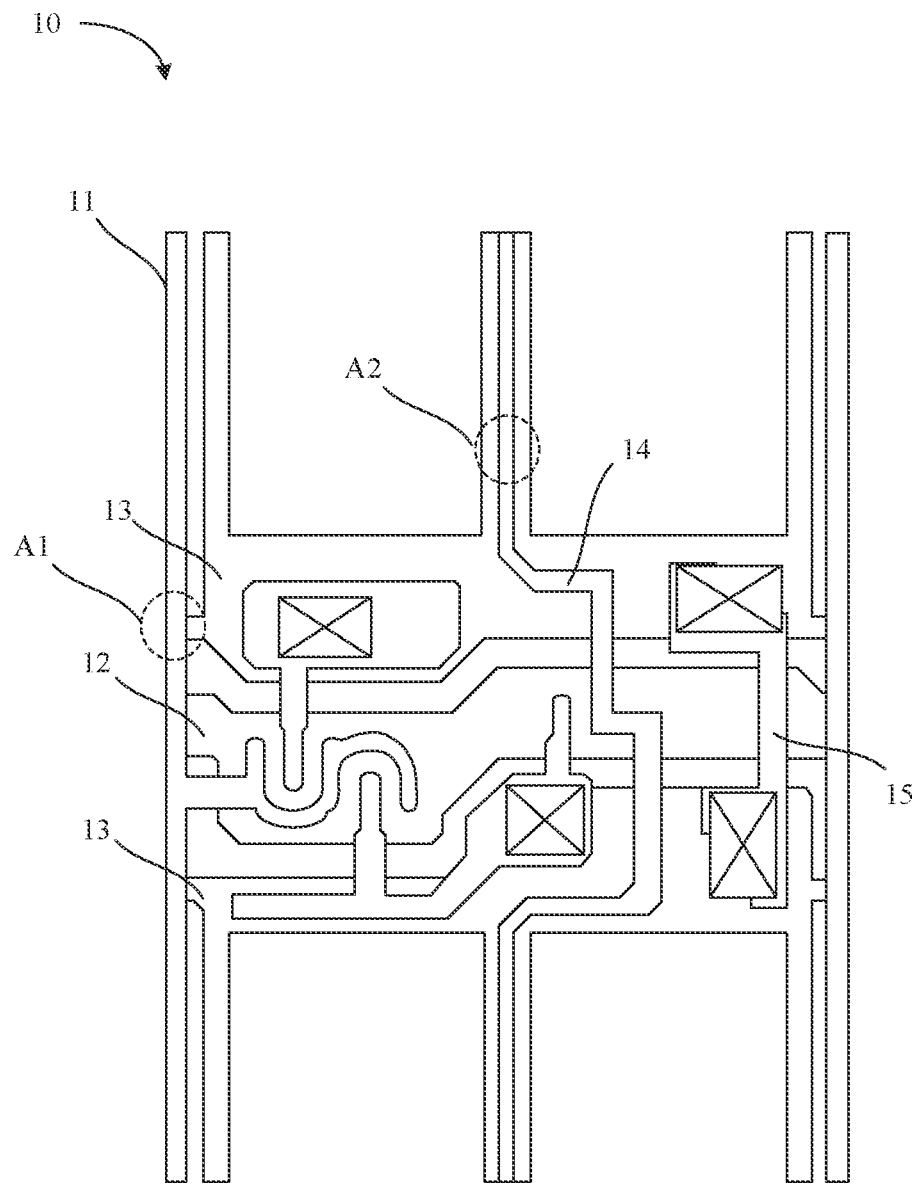
FIG. 1 shows a schematic diagram of a pixel of an array substrate in the prior art.
Figure 2:
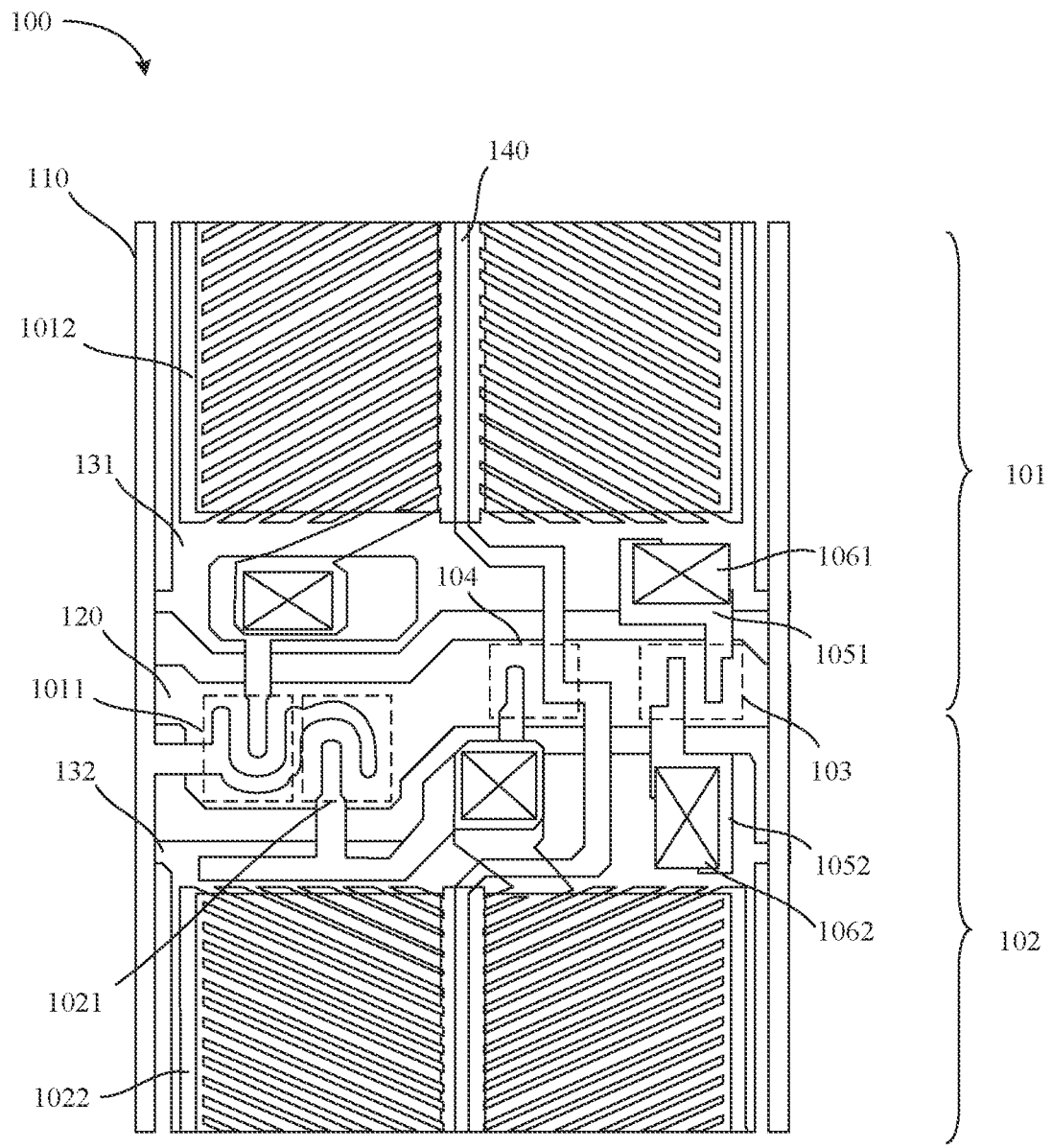
FIG. 2 shows a schematic diagram of a pixel according to a first embodiment of the present disclosure.
Figure 3:
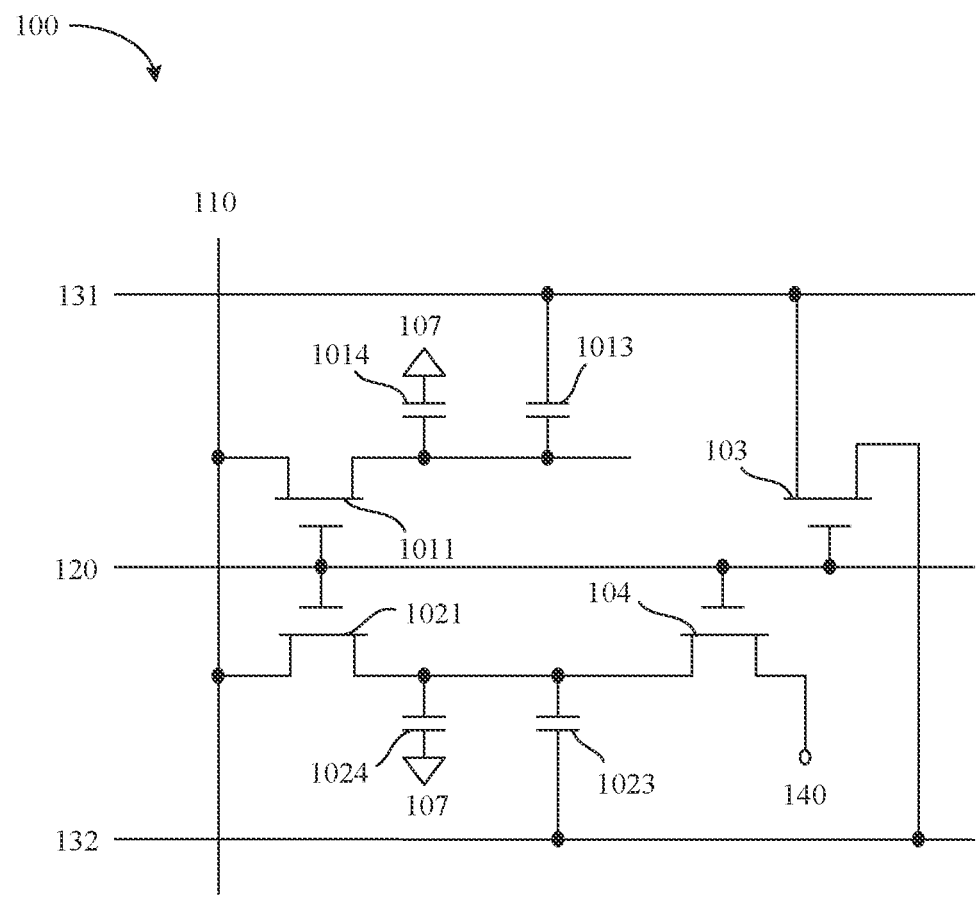
FIG. 3 shows an equivalent circuit diagram of the pixel of FIG. 2.

Referring to FIG. 2 and FIG. 3, FIG. 2 shows a schematic diagram of a pixel according to a first embodiment of the present disclosure, and FIG. 3 shows an equivalent circuit diagram of the pixel of FIG. 2. The pixel 100 is arranged at an intersection of a data line 111 and a scan line 120. The data line 111 is arranged along a vertical direction, and the scan line 120 is arranged along a horizontal direction. The pixel 100 includes a first sub-pixel 101 and a second sub-pixel 102 arranged along the horizontal direction. The first sub-pixel 101 and the second sub-pixel 102 are connected to the same data line 110 and the same scan line 120. Furthermore, the first sub-pixel 101 is connected to the first common electrode line 131, and the second sub-pixel 102 is connected to the second common electrode line 132. The first common electrode line 131 and the second common electrode line 132 are arranged along the horizontal direction and are arranged on opposite sides of the scan line 120.

As shown in FIG. 2 and FIG. 3, the first sub-pixel 101 includes a first driving transistor 1011, a first pixel electrode 1012, a first storage capacitor 1013, and a first liquid crystal capacitor 1014. A gate of the first driving transistor 1011 is connected to the scan line 120. One of a source and a drain of the first driving transistor 1011 is connected to the data line 110. Another one of the source and the drain of the first driving transistor 1011 is connected to the first pixel electrode 1012, and is connected to the first common electrode line 131 through the first storage capacitor 1013. That is, one end of the first storage capacitor 1013 is connected to the first common electrode line 131, and another end of the first storage capacitor 1013 is connected to the another one of the source and the drain of the first driving transistor 1011. One end of the first liquid crystal capacitor 1014 is connected to an opposite electrode 107 of an opposite substrate, and another end of the first liquid crystal capacitor 1014 is connected to the another one of the source and the drain of the first driving transistor 1011.

As shown in FIG. 2 and FIG. 3, the second sub-pixel 102 includes a second driving transistor 1021, a second pixel electrode 1022, a second storage capacitor 1023, and a second liquid crystal capacitor 1024. A gate of the second driving transistor 1021 is connected to the scan line 120. One of a source and a drain of the second driving transistor 1021 is connected to the data line 110. Another one of the source and the drain of the second driving transistor 1021 is connected to the second pixel electrode 1022, and is connected to the second common electrode line 132 through the second storage capacitor 1023. That is, one end of the second storage capacitor 1023 is connected to the second common electrode line 132, and another end of the second storage capacitor 1023 is connected to the another one of source and the drain of the second driving transistor 1021. One end of the second liquid crystal capacitor 1024 is connected to the opposite electrode 107 of the opposite substrate, and another end of the second liquid crystal capacitor 1024 is connected to the another one of the source and the drain of the second driving transistor 1021.

As shown in FIG. 2 and FIG. 3, the pixel 100 also includes a common transistor 103. A gate of the common transistor 103 is connected to the scan line 120. One of a source and a drain of the common transistor 103 is connected to the first common electrode line 131. Another one of the source and the drain of the common transistor 103 is connected to the second common electrode line 132. Specifically, the pixel 100 further includes a first connecting electrode 1051, a second connecting electrode 1052, a first via hole 1061, and a second via hole 1062. The first connecting electrode 1051 is disposed on the scan line 120 and extends to overlap with the first common electrode line 131. The second connecting electrode 1052 is disposed on the scan line 120 and extends to overlap with the second common electrode line 132. The first via hole 1061 is formed at an overlap portion of the first connecting electrode 1051 and the first common electrode line 131, and exposes the first common electrode line 131. The first connecting electrode 1051 is connected to the first common electrode line 131 through the first via hole 1061. The second via hole 1062 is formed at an overlap portion of the second connecting electrode 1052 and the second common electrode line 132, and exposes the second common electrode line 132. The second connecting electrode 1052 is connected to the second common electrode line 132 through the second via hole 1062. The first connection electrode 1051 and the second connection electrode 1052 are separated from each other where they overlap with the scan line 120, and together form the common transistor 103.

As shown in FIG. 2 and FIG. 3, in this embodiment, when a positive signal is applied to the scan line 120, the common transistor 103 is turned on, and the first common electrode line 131 and the second common electrode line 132 are electrically connected, thereby ensuring the stability of a common voltage. In addition, when a signal detection process is performed, a negative signal is applied to the scan line 120, and a positive signal is applied to other lines. At this time, the common transistor 103 is turned off, and the first common electrode line 131 and the second common electrode line 132 are electrically separated from each other. If a short circuit occurs between the common electrode line and the data line 110 or a shared electrode line 140, the lines in the horizontal direction can be located according to an acquired short circuit signal, and the defect lines can be further repaired.

As shown in FIG. 2 and FIG. 3, the pixel 100 further includes a shared transistor 104. A gate of the shared transistor 104 is connected to the scan line 120. One of a source and a drain of the shared transistor 104 is connected to the another one of the source and the drain of the second driving transistor 1021. Another of the source and the drain of the shared transistor 104 is connected to the shared electrode line 140. The shared electrode line 140 is arranged between two adjacent data lines 110. The shared electrode line 140 extends from the first sub-pixel 101 to the second sub-pixel 102 along the vertical direction. The first driving transistor 1011 is configured to drive the first sub-pixel 101. The second driving transistor 1021 is configured to drive the second sub-pixel 102. The shared transistor 104 is configured to release the charge in the second sub-pixel 102. Specifically, when the shared transistor 104 is turned on, part of the charge in the second sub-pixel 102 is released into the shared transistor 104. As a result, there is a potential difference between the first sub-pixel 101 and the second sub-pixel 102, and tilt angles of liquid crystal molecules are different, thereby reducing a color shift.

Figure 4:
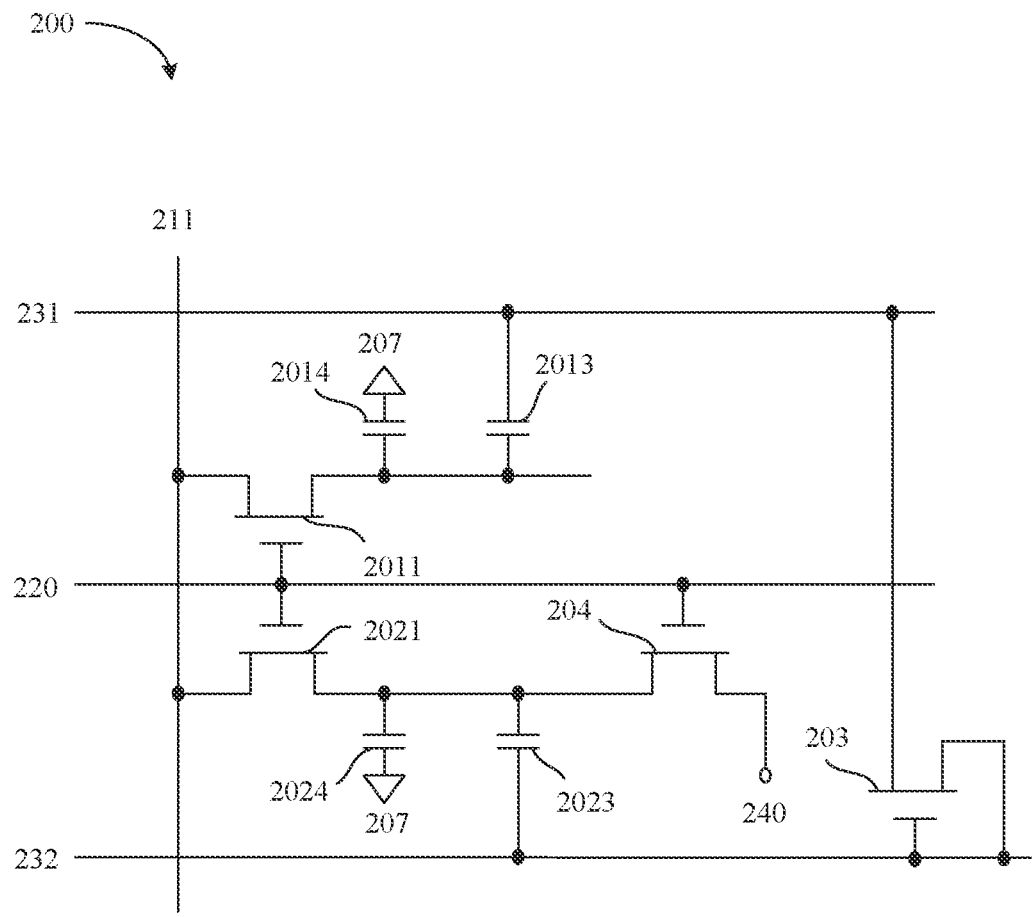
FIG. 4 shows an equivalent circuit diagram of a pixel according to a second embodiment of the present disclosure.

Referring to FIG. 4, which shows an equivalent circuit diagram of a pixel according to a second embodiment of the present disclosure. A pixel 200 is arranged at an intersection of a data line 211 and a scan line 220. The data line 211 is arranged along a vertical direction, and the scan line 220 is arranged along a horizontal direction. The pixel 200 includes a first sub-pixel and a second sub-pixel arranged along the horizontal direction. The first sub-pixel and the second sub-pixel are connected to the same data line 210 and the same scan line 220. Furthermore, the first sub-pixel is connected to a first common electrode line 231, and the second sub-pixel is connected to a second common electrode line 232. The first common electrode line 231 and the second common electrode line 232 are arranged along the horizontal direction, and are arranged on opposite sides of the scan line 220.

As shown in FIG. 4, the first sub-pixel includes a first driving transistor 2011, a first pixel electrode, a first storage capacitor 2013, and a first liquid crystal capacitor 2014. The second sub-pixel includes a second driving transistor 2021, a second pixel electrode, a second storage capacitor 2023, and a second liquid crystal capacitor 2024. One ends of the first liquid crystal capacitor 2014 and the second liquid crystal capacitor 2024 are connected to an opposite electrode 207 of an opposite substrate. The pixel 200 also includes a common transistor 203 and a shared transistor 204. One of a source and a drain of the shared transistor 204 is connected to a shared electrode line 240. The pixel 200 of the second embodiment is substantially the same as the pixel 100 of the first embodiment. A difference between the two is that a gate of the common transistor 203 of the pixel 200 of the second embodiment is connected to the second common electrode line 232. In some embodiments, the gate of the common transistor can also be connected to the first common electrode line.

As shown in FIG. 4, in this embodiment, when a positive signal is applied to the first common electrode line 231 and the second common electrode line 232, the common transistor 203 is turned on, and the first common electrode line 231 and the second common electrode line 232 are electrically connected, thereby ensuring the stability of a common voltage. In addition, when a signal detection process is performed, a negative signal is applied to the first common electrode line 231 and the second common electrode line 232, and a positive signal is applied to other lines. At this time, the common transistor 203 is turned off, and the first common electrode line 231 and the second common electrode line 232 are electrically separated from each other. If a short circuit occurs between the common electrode line and the data line 210 or the shared electrode line 240, the lines in the horizontal direction can be located according to an acquired short circuit signal, and the defect lines can be further repaired. On the other hand, the design of other elements in the pixel 200 of the second embodiment is the same as that of the first embodiment, and will not be repeated here.

Figure 5:
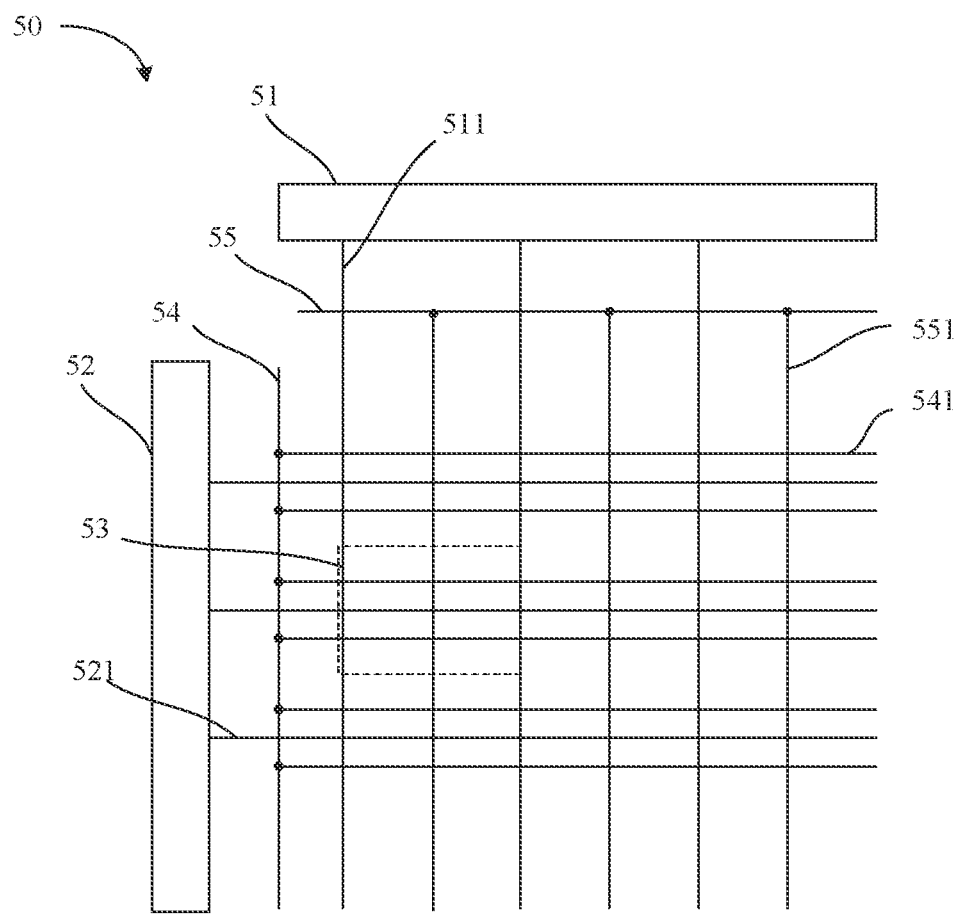
FIG. 5 shows a schematic diagram of an array substrate according to an embodiment of the present disclosure.

Referring to FIG. 5, which shows a schematic diagram of an array substrate according to an embodiment of the present disclosure. An array substrate 50 includes a plurality of data lines 511, a plurality of scan lines 521, a plurality of common electrode lines 541, a plurality of shared electrode lines 551, and a plurality of pixels. The plurality of data lines 511 and the plurality of shared electrode lines 551 extend along a vertical direction. The plurality of scan lines 521 and the plurality of common electrode lines 541 extend along the horizontal direction. The plurality of data lines 511 and the plurality of scan lines 521 intersect with each other and define a plurality of pixel regions 53. The plurality of pixels are arranged in an array and disposed in the pixel regions 53. The pixel in this embodiment can be any of the above-mentioned pixels, and will not be repeated here.

As shown in FIG. 5, the array substrate 50 also includes a data driver 51, a scan driver 52, a common electrode bus line 54, and a shared electrode bus line 55. The plurality of data lines 511 are connected to the data driver 51. The plurality of scan lines 521 are connected to the scan driver 52. The plurality of common electrode lines 541 are connected to the common electrode bus line 54. The plurality of shared electrode lines 551 are connected to the shared electrode bus line 55.

Figure 6:
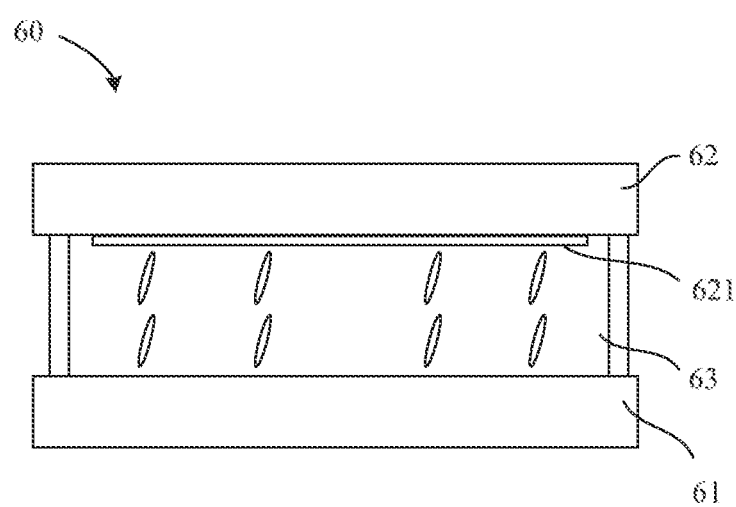
FIG. 6 shows a schematic diagram of a display device according to an embodiment of the present disclosure.

Referring to FIG. 6, which shows a schematic diagram of a display device according to an embodiment of the present disclosure. The display device 60 includes an array substrate 61, an opposite substrate 62, and a liquid crystal layer 63. The array substrate 61 includes any of the above-mentioned array substrates and pixels, and details are not described herein. The opposite substrate 62 is opposite to the array substrate 61 and includes an opposite electrode 621. The liquid crystal layer 63 is disposed between the array substrate 61 and the opposite substrate 62.

In the present disclosure, the first common electrode line and the adjacent second common electrode line are connected through the common transistor. When the common transistor is turned on, the first common electrode line and the second common electrode line are electrically connected, thereby ensuring the stability of the common voltage. In addition, when a signal detection process is performed, the common transistor is turned off, so that the lines in the horizontal direction can be located according to the acquired short-circuit signal, and the defect lines can be further repaired.

The pixel, the array substrate, and the display device of the embodiments of the present disclosure are described in detail above. Specific embodiments are used in this document to describe the principle and implementations of the present disclosure. The description of the above embodiments is only used to help understand the technical solutions and core ideas of the present disclosure. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present disclosure.

What is claimed is:

1. A pixel, comprising:
 a first driving transistor, wherein a gate of the first driving transistor is connected to a scan line, and one of a source and a drain of the first driving transistor is connected to a data line;
 a first storage capacitor, wherein one end of the first storage capacitor is connected to a first common electrode line, and another end of the first storage capacitor is connected to another one of the source and the drain of the first driving transistor;
 a second driving transistor, wherein a gate of the second driving transistor is connected to the scan line, and one of a source and a drain of the second driving transistor is connected to the data line;
 a second storage capacitor, wherein one end of the second storage capacitor is connected to a second common electrode line, and another end of the second storage capacitor is connected to another one of the source and the drain of the second driving transistor; and
 a common transistor, wherein one of a source and a drain of the common transistor is connected to the first common electrode line, and another one of the source and the drain of the common transistor is connected to the second common electrode line.

2. The pixel according to claim 1, wherein a gate of the common transistor is connected to the scan line.

3. The pixel according to claim 1, wherein a gate of the common transistor is connected to the first common electrode line or the second common electrode line.

4. The pixel according to claim 1, further comprising a shared transistor, wherein a gate of the shared transistor is connected to the scan line, one of a source and a drain of the shared transistor is connected to one of the source and the drain of the second driving transistor, and another one of the source and the drain of the shared transistor is connected to a shared electrode line.

5. The pixel according to claim 1, further comprising:
a first connecting electrode disposed on the scan line and extends to overlap with the first common electrode line;
a second connecting electrode disposed on the scan line and extends to overlap with the second common electrode line;
a first via hole formed at an overlap portion of the first connecting electrode and the first common electrode line, and exposing the first common electrode line, wherein the first connecting electrode is connected to the first common electrode line through the first via hole; and
a second via hole formed at an overlap portion of the second connecting electrode and the second common electrode line, and exposing the second common electrode line, wherein the second connecting electrode is connected to the second common electrode line through the second via hole, and the first connecting electrode, the second connecting electrode, and the scan line together form the common transistor.

6. The pixel according to claim 1, wherein the pixel comprises a first sub-pixel and a second sub-pixel arranged in a horizontal direction, the first sub-pixel comprises the first driving transistor and the first storage capacitor, and the second sub-pixel comprises the second driving transistor and the second storage capacitor.

* * * * *